No. 688,199. Patented Dec. 3, 1901.
G. H. F. SCHRADER.
TIRE VALVE.
(Application filed Feb. 12, 1900.)
(No Model.)

WITNESSES:
Fred White
René Brunne

INVENTOR:
George H. F. Schrader,
By his Attorneys,

UNITED STATES PATENT OFFICE.

GEORGE H. F. SCHRADER, OF NEW YORK, N. Y.

TIRE-VALVE.

SPECIFICATION forming part of Letters Patent No. 688,199, dated December 3, 1901.

Application filed February 12, 1900. Serial No. 4,899. (No model.)

*To all whom it may concern:*

Be it known that I, GEORGE H. F. SCHRADER, a citizen of the United States, residing in the city, county, and State of New York, have invented certain new and useful Improvements in Tire-Valves, of which the following is a specification.

This invention relates to pneumatic valves for tires. Such valves have been made with a flat-sided externally-screw-threaded shell clamped to the tire and passing through the felly, to which shell a seat member has been clamped by a coupling, the seat member carrying the valve proper and being screw-threaded at its outer end to couple with an air-pump for inflating the tire and to be closed by a cap when in use. To prevent the seat member from rotating in the shell, the shell has been notched and the seat member has had a lug projecting into this notch, and to make a tight joint between the seat member and shell a rubber packing has been placed inside of the shell to be clamped between it and the seat member.

My present invention aims to provide an improved construction for valves in which the seat member is held on the end of the shell by a coupling, and to this end I provide an improved valve-plunger which is irremovably connected within the shell, so that it cannot be lost, a deflating-pin which is irremovably connected to the seat member, so that it cannot be lost, and an improved construction of cap.

Figure 1:
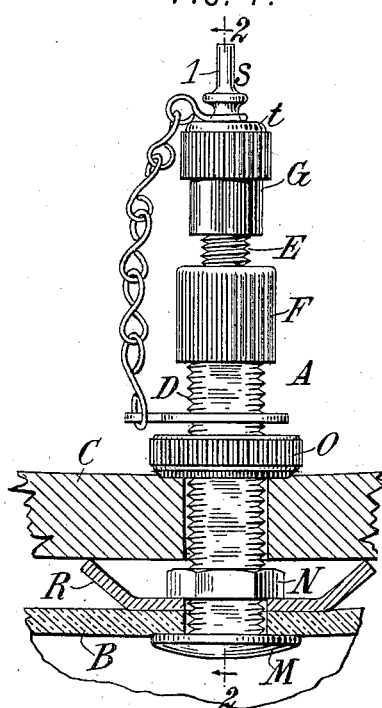
Figure 2:
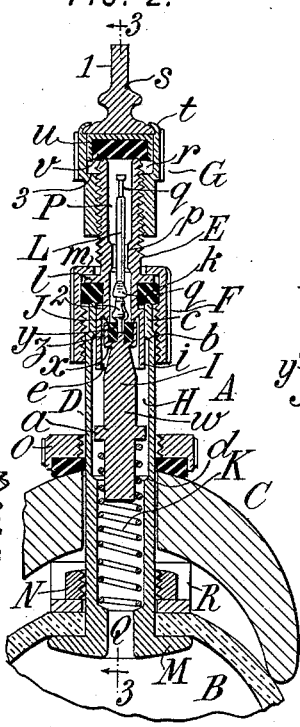
Figure 3:
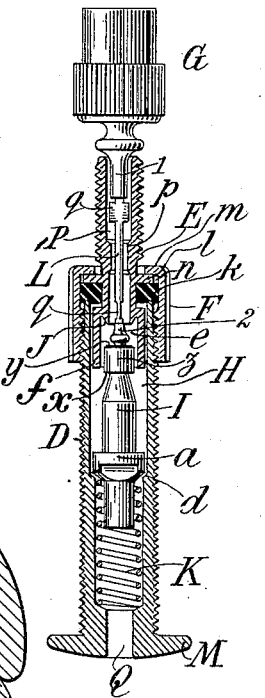
Figure 4:
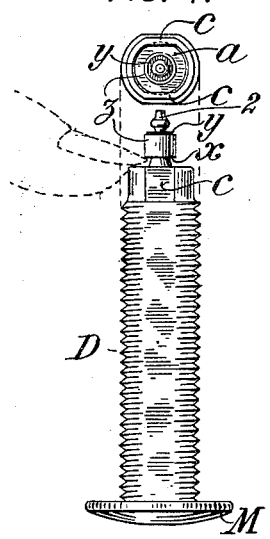
Figure 5:
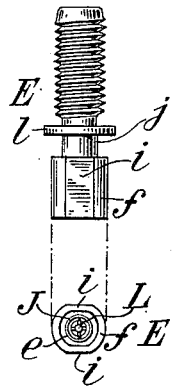
Figure 6:
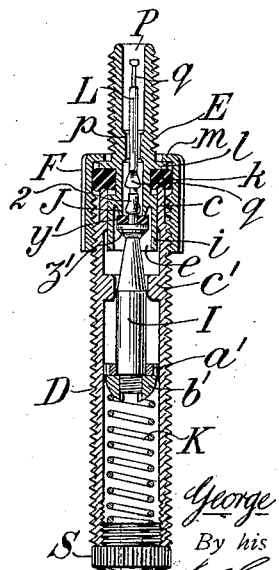

In the accompanying drawings, Figure 1 is a side elevation of the preferred form of my improved valve, showing it in use on a tire, a fragment of the tire and felly of the wheel being shown in section. Fig. 2 is a longitudinal section thereof cut on the line 2 2 in Fig. 1 and looking in the direction of the arrow, the parts being shown in the closed position. Fig. 3 is a longitudinal section cut on the line 3 3 of Fig. 2 and looking in the direction of the arrow, the cap being inverted and the valve shown in the open position. Fig. 4 is a plan view and side elevation of the valve-shell and valve-plunger when the seat member is removed. Fig. 5 is a side elevation and bottom end view of the seat member alone, and Fig. 6 is a longitudinal section of a modified form of valve.

Referring to the drawings, A represents the valve, B the tire, and C the felly, of a wheel. The valve comprises a shell D, a seat member E, a coupling F, connecting them together, a cap G for the seat member, a valve-chamber H in the shell, and a valve proper, I, in said chamber. The seat member has an annular seat J, and the valve proper is forced against this seat by a spring K. A deflating-pin L is fixed in the seat member, so that by unscrewing and inverting the cap G its point can be used to press in the pin L and open the valve, as shown in Fig. 3. The lower end of the shell D is connected to the tire in any suitable way to make a leak-tight joint, as by having its flange M pressed into the tire and clamped tightly therein by the nut N. The nut O clamps the shell D in the socket in the felly C.

P is the ingress-passage leading to the seat J, and Q is the egress-passage leading from the valve-chamber into the tire. The plate R engaging the flat sides of the shell prevents it from turning.

In all the general features thus far referred to the valve may be similar to those now used or may be of any suitable construction with which my improvements, which I will now describe in detail, can be employed.

One new feature consists in a top repair-valve inseparably connecting the valve proper, I, within the shell D, so that the valve proper cannot be lost when the seat member is removed. This is preferably done by forming the valve proper with a wide flange $a$ and after inserting the valve through the outer end forming one or more internal shoulders $b$ near the open end of the shell, past which the flange $a$ cannot pass. I prefer to form the shoulders $b$ by pressing in one or both of the side walls of the smooth end of the shell, as shown at $c$, on each side, so that the flange $a$ cannot pass them, as shown in Fig. 4. This makes the inlet to the chamber H smaller than its interior. Below the flange $a$ I may form a shoulder $d$, which also engages the flange $a$ to prevent the valve proper from pressing in so far that it will injure the spring K, but which is evidently not essential to the operation of the valve. I also provide an improved seat member E, which has a guiding-chamber $e$ below the seat J for guiding the valve proper to the seat and held on the end of the shell preferably by a deep flange $f$, having one or more flat sides $i$ fitting within the flat side or sides $c$ of the mouth of the shell D, so that the seat member cannot turn in the shell, and a coupling F holding the seat member down on the shell. The chamber $e$ is so deep that the valve proper will be prevented by the shoulder $d$ from escaping from the chamber $e$ when the valve is open, and the flange $f$ fits the shell with sufficient snugness to prevent the seat member from being tilted so much that the valve cannot seat properly.

Above the flange $f$ the seat member carries a rubber packing-ring $k$, preferably seated in a groove formed by the flange $f$, and a shoulder $l$, on which shoulder the flange $m$ of the coupling F bears. The coupling F has a socket $n$ receiving the ring $k$, of larger diameter than its internal screw-thread, so that the screw-thread constitutes a shoulder below the packing-ring for preventing separation of the seat member and coupling, the packing being so small as to permit the coupling to turn freely on it. When the coupling is screwed on the shell D, the packing-ring is pressed against the smooth mouth of the shell without any twisting of the material and makes a leak-tight joint between the shell and the seat member E.

The duct P through the member E has an internal shoulder $p$, and the pin L has projections $q$ above and below this shoulder, formed, preferably, by flattening the pin near its ends, as shown, which prevent the pin from escaping from the duct. The ends of the pins are retained of their original cross-section to insure contact between such ends and the pin 1 on the cap and the head 2 on the valve.

The cap G has a large internal chamber $r$ and a separate top $s$, which is swaged on the cap by a flange $t$. Before the top is swaged to the cap a metal cup $u$, holding a packing-disk $v$, is inserted in the chamber $r$. This cup prevents the disk from expanding, and the cup fits loosely in the socket $r$, so that the cap can revolve without turning the cup, thus preventing twisting of the packing-disk and avoiding injury to it when the cap is screwed up. The swaged connection, together with the lower wall 3 of the chamber, serves to hold the packing and its cup in the cap when the cap is off the valve.

I provide an improved construction of valve proper by making the plunger $w$ of such length that its end will project beyond the mouth of the shell, as shown in Fig. 4, and forming it with a shoulder $x$, under which the thumb-nail or a tool can be placed to hold the plunger outwardly while the user places a new packing $y$ in the cup $z$. I also form it with a central projection having a head 2 above the packing, which prevents the packing from escaping from the cup and which also receives the pressure of the pin L and prevents the pin from injuring the packing. The inner end of the plunger is cylindrical and fits within the spring K to keep it in place. The packing $y$ may be a solid disk when no central projection is formed in the cup $z$.

With my new valve the user can remove the seat member E by unscrewing the coupling F without danger of losing any part of the valve, and when the seat member is screwed on there is certain to be a tight joint at the mouth of the shell, because the edge is smooth and continuous. A firm and tight joint can be easily made between the seat member and the shell, and rotation of the seat member is prevented without having to notch the end of the shell. The packing-ring $k$ will not be injured by screwing the coupling tight, as the packing-ring will not have to rotate. The valve proper will be correctly guided to its seat and cannot get out of order.

When the seat member is removed, the valve proper cannot be lost, and it can be held up and cleaned or renewed without difficulty. The plunger can be made large and strong and will be heavy enough to operate with certainty under any pressure and to resist injury.

It is impossible for the packing in the cap to be lost, as is frequently the case with former constructions.

Fig. 6 shows a construction in which the valve proper, I, is inserted from the rear end of the shell and has a ring $a'$, held on by a screw $b'$ and engaging a shoulder $c'$ to limit the upward movement of the valve proper. The washer $y'$ here sets on a flat flange $z'$, on which it is held by the head of the upwardly-projecting pin, as before described. The lower end of the shell is here closed by a nut S, which holds the spring K in place, and the outer end of the shell is constructed with the flat portion $c$ and receives the seat member E and coupling F, which are of the same construction as before described.

It is obvious that some of the points of my improvement may be useful in other combinations than those specifically set forth in the valve which I have described. For example, the shouldered valve proper, I, might be useful in other shells than that which I have shown and described. The cap, the seat member, or the shell might be combined with other elements than those herein set out without sacrificing the advantages incidental to my invention. While, therefore, I have described with great particularity and completeness a valve embodying my invention, I am not to be understood as limiting myself to the construction so described.

It will be seen that by my invention I provide a top repair-valve in which the valve proper is inserted through the open end of the valve and is always accessible through this end for repair, renewal, or cleaning and is still irremovably connected to the shell; also, that I provide a removable seat member having an open-ended guiding-chamber below the seat which serves to center and guide the valve proper in ordinary operations and which can easily be removed for giving access to the seat to clean it.

What I claim, therefore, and desire to secure by Letters Patent, are the following-defined novel elements, each substantially as described:

1. A top repair-valve for pneumatic tires and the like consisting of a shell, a seat member, and means for holding the seat member removably on the mouth of the shell, in combination with a valve proper within the shell and free to move therein and movable partially out of the mouth thereof but held against separation therefrom when the seat member is removed.

2. In pneumatic valves, a shell, a seat member, and means for holding the seat member removably on the mouth of the shell, in combination with a valve proper within the shell, and movable partially out of the mouth thereof, the shell and the valve proper having engaging shoulders which prevent the latter from escaping from the shell when the seat member is removed.

3. In pneumatic valves, a shell having an open end and a flattened portion, a seat member fitting the end of the shell and having a flattened portion engaging the flattened portion of the shell to prevent rotation of the seat member in the shell, a valve proper, and means for retaining the seat member on the end of the shell.

4. In pneumatic valves, a shell having an open end and a laterally-flattened portion forming an internal shoulder, and a valve proper in the shell having a stop adapted to coöperate with said shoulder in preventing the escape of said valve proper from said shell.

5. In pneumatic valves, a shell having an open end and a flattened portion the edge of which forms an internal shoulder, a valve proper in the shell having a stop adapted to coöperate with said shoulder in preventing the escape of said valve proper from said shell, a seat member having a flattened portion engaging the flattened portion of the shell to prevent rotation of said member in said shell, and means for retaining said seat member on the end of said shell.

6. In pneumatic valves, a shell having an open end and a valve proper therein, in combination with a seat member fitting on said end and having a socket for receiving the valve proper and a seat within said socket, said valve proper having a plunger extending at one end into said socket, for guiding said valve proper therein, and extending at its other end into said shell, for guiding said valve proper therein, and means for holding the seat member on the end of the shell whereby the upper end of the valve proper is guided by the socket in the seat member.

7. In pneumatic valves, a shell, and a valve proper therein having an end removable outwardly to an accessible position, and having a shoulder beneath which a tool can be inserted to hold the end of the valve proper in such position for cleaning or repair.

8. In pneumatic valves, a valve proper consisting of a plunger $w$ having guiding provisions at its lower end, and a cup-shaped cavity in its upper end, a pin projecting from said end, a packing-ring in said cavity, and a head on said upper pin holding said packing-ring in place.

9. In pneumatic valves, a shell having a continuous smooth edge surrounding its mouth, a seat member fitting the mouth of the shell, means for preventing rotation of said seat member when fitted onto said shell, a packing-ring on said seat member, and means for drawing the seat member and packing-ring against the mouth of the shell.

10. In pneumatic valves, a cap $G$ having a top $s$ consisting of a separate piece and connected to the cap by an overhanging flange, and a shoulder 3, so that a cavity $r$ is formed in said cap, a cup-shaped washer $u$ in the cavity and a packing-disk $v$ in the washer, whereby the disk is prevented from expanding sidewise and the cap can rotate without rotating the disk.

11. In pneumatic valves, a shell having a valve-chamber, a valve proper therein, a seat member fitting the mouth of said chamber, means for holding the seat member and shell together, means for preventing relative rotation of said seat member and said shell, and a deflating-pin irremovably connected in said seat member.

12. In pneumatic valves, a seat member, a deflating-pin therein, a stop in the seat member and a coöperating stop in the deflating-pin, the latter stop consisting of a flattened portion of said pin intermediate of its ends.

13. In pneumatic valves, a shell and a valve proper therein, in combination with a seat member having a seat and a socket for admitting said valve proper and guiding it to said seat, and means for limiting the movement of said valve proper to prevent its escape from said guiding-socket, said valve proper projecting partially out of said socket.

14. In valves, a shell, and a valve proper therein, in combination with a seat member removably carried by said shell, having a socket open at its end for permitting said valve proper to enter said socket, and a seat within said socket engaged by said valve proper, said valve proper projecting partially out of said socket.

In witness whereof I have hereunto signed my name in the presence of two subscribing witnesses.

GEORGE H. F. SCHRADER.

Witnesses:
GEORGE H. FRASER,
THOMAS F. WALLACE.